US006891993B2

(12) United States Patent
Prather et al.

(10) Patent No.: US 6,891,993 B2
(45) Date of Patent: May 10, 2005

(54) MULTI-CHANNEL WAVELENGTH DIVISION MULTIPLEXING USING PHOTONIC CRYSTALS

(75) Inventors: Dennis W. Prather, Landenburg, PA (US); Ahmed Sharkawy, Newark, DE (US); Shouyun Shi, Newark, DE (US)

(73) Assignee: The University of Delaware, Newark, DE (US)

( * ) Notice: Subject to any disclaimer, the term of this patent is extended or adjusted under 35 U.S.C. 154(b) by 83 days.

(21) Appl. No.: 10/166,850

(22) Filed: Jun. 11, 2002

(65) Prior Publication Data

US 2002/0191905 A1 Dec. 19, 2002

Related U.S. Application Data

(60) Provisional application No. 60/297,389, filed on Jun. 11, 2001.

(51) Int. Cl.[7] .............................. G02B 6/28; G02B 6/12; G02B 6/293
(52) U.S. Cl. .............................. 385/24; 385/39; 385/50; 385/14
(58) Field of Search ............................. 385/14, 15, 24, 385/39, 50, 129

(56) References Cited

U.S. PATENT DOCUMENTS 6,512,866 B1 * 1/2003 Fan et al. ..................... 385/27

OTHER PUBLICATIONS

P.R. Villeneuve et al., Microcavities in photonic crystals: Mode symmetry, tunability, and coupling efficiency, Physical Review B, vol. 54, No. 11, pp. 7837–7842 (Sep. 1996).*

K.O. Hill et al., "Photosensitivity in optical fiber waveguides: Application to reflection filter fabrication," *Applied Physics Letters*, vol. 32, No. 10, pp. 647–649 (May 1978).

E. Yablonovitch, "Inhibited Spontaneous Emission in Solid–State Physics and Electronics," *Physical Review Letters*, vol. 58, No. 20, pp. 2059–2062 (May 1987).

S. John, "Strong Localization of Photons in Certain Disordered Dielectric Superlattices," *Physical Review Letters*, vol. 58, No. 23, pp. 2486–2489 (Jun. 1987).

C. Dragone, "Efficient N×N Star Couplers Using Fourier Optics," *J. of Lightwave Tech.*, vol. 7, No. 3, pp. 479–489 (Mar. 1989).

K.M. Leung et al., "Photon band structures: The plane–wave method," *Physical Review B*, vol. 41, No. 14, pp. 10188–11242 (May 1990).

S.L. McCall et al., "Microwave Propagation in Two–Dimensional Dielectric Lattices," *Physical Review Letters*, vol. 67, No. 15, pp. 2017–2020 (Oct. 1991).

R.D. Meade et al., "Photonic bound states in periodic dielectric materials," *Physical Review B*, vol. 44, No. 24, pp. 13772–13774 (Dec. 1991).

(Continued)

*Primary Examiner*—Akm Enayet Ullah
*Assistant Examiner*—Omar Rojas
(74) *Attorney, Agent, or Firm*—Connolly Bove Lodge & Hutz LLP

(57) ABSTRACT

Described herein is a multi-channel wavelength division multiplexing (WDM) device including a two-dimensional photonic crystal. The photonic crystal consists of two primary components: (1) a waveguiding element created by line defects formed in the photonic crystal, and (2) frequency-selective elements created by high Q-value microcavities formed in the crystal. The multi-channel WDM system offers a flexible design and high channel density.

11 Claims, 3 Drawing Sheets

OTHER PUBLICATIONS

E. Yablonovitch et al., "Donor and Acceptor Modes in Photonic Band Structure," *Physical Review Letters*, vol. 67, No. 24, pp. 3380–3383 (Dec. 1991).

J.P. Berenger, "A Perfectly Matched Layer for the Absorption of Electromagnetic Waves," *J. of Computational Physics*, vol. 114, pp. 185–200 (1994).

H. Takahashi et al., Wavelength Multiplexer Based on $SiO_2$–$Ta_2O_5$ Arrayed–Waveguide Grating, *J. Lightwave Tech.*, vol. 12, No. 6, pp. 989–995 (Jun. 1994).

J.D. Joannopoulos et al., *Photonic Crystals* (1995).

A. Taflove, *Computational Electrodynamics: The Finite–Difference Time–Domain Method* (1995).

M.P. Kessler et al., "Antenna Design with The Use Of Photonic Band–Gap Materials As All–Dielectric Planar Reflectors," *Microwave and Optical Tech. Letters*, vol. 11, No. 4, pp. 169–174 (Mar. 1996).

P.R. Villeneuve et al., "Microcavities in photonic crystals: Mode symmetry, tunability, and coupling efficiency," *Physical Review B*, vol. 54, No. 11, pp. 7837–7842 (Sep. 1996).

A. Taflove, *Advances in Computational Electrodynamics: The Finite–Difference Time–Domain Method* (1998).

S. Fan et al., "Channel Drop Tunneling through Localized States," *Physical Review Letters*, vol. 80, pp., No. 5, 960–963 (Feb. 1998).

S. Fan et al., "Channel drop fliters in photonic crystals," *Optics Express*, vol. 3, No. 1, (Jul. 1998).

H. Kosaka et al., "Superprism phenomena in photonic crystals," *Physical Review B*, vol. 58, No. 16, pp. R10096–R10099 (Oct. 1998).

T. Ueta et al., "Limits on quality factors of localized defect models in photonic crystals due to dielectric loss," *J. of Applied Physics*, vol. 84, No. 11, pp. 6299–6304 (Dec. 1998).

H. Kosaka et al., "Self–collimating phenomena in photonic crystals," *Applied Physics Letters*, vol. 74, No. 9, pp. 1212–1214 (Mar. 1999).

H. Kosaka et al., "Photonic crystals for micro lightwave circuits using wavelength–dependent angular beam steering," *Applied Physics Letters*, vol. 74, No. 10, pp. 1370–1372 (Mar. 1999).

A. Taflove et al., *Computational Electrodynamics: the Finite–Difference Time–Domain Method*, 2d ed. (2000).

\* cited by examiner dimensions of centimeters or meters, in order to support a large
MULTI-CHANNEL WAVELENGTH DIVISION MULTIPLEXING USING PHOTONIC CRYSTALS

CLAIM FOR PRIORITY

The present application claims priority of U.S. Provisional Patent Application Ser. No. 60/297,389, filed Jun. 11, 2001 the disclosure of which being incorporated by reference herein in its entirety.

BACKGROUND OF THE INVENTION

A. Field of the Invention

The present invention relates generally to photonic crystals, and, more particularly to multi-channel wavelength division multiplexing using photonic crystals.

B. Description of the Related Art

During the last decade photonic crystals (also known as photonic band-gap materials) have risen from an obscure technology to a prominent field of research. In large part this is due to their unique ability to control, or redirect, the propagation of light. E. Yablonovich, "Inhibited spontaneous emission in solid-state physics and electronics," *Physical Review Letters*, vol. 58, pp. 2059–2062 (May 1987), and S. John, "Strong localization of photons in certain disordered dielectric superlattices," *Physical Review Letters*, vol. 58, pp. 2486–2489 (June 1987), initially proposed the idea that a periodic dielectric structure can possess the property of a band gap for certain frequencies in the electromagnetic spectra, in much the same way as an electronic band gap exists in semiconductor materials. This property affords photonic crystals with a unique ability to guide and filter light as it propagates within it. Thus, photonic crystals have been used to improve the overall performance of many optoelectronic devices.

The concept of a photonic band gap material is as follows. In direct conceptual analogy to an electronic band gap in a semiconductor material, which excludes electrical carriers having stationary energy states within the band gap, a photonic band gap in a dielectric medium excludes stationary photonic energy states (i.e., electromagnetic radiation having some discrete wavelength or range of wavelengths) within that band gap. In semiconductors, the electronic band gap results as a consequence of having a periodic atomic structure upon which the quantum mechanical behavior of the electrons in the material must attain eigenstates. By analogy, the photonic band gap results if one has a periodic structure of a dielectric material where the periodicity is of a distance suitable to interact periodically with electromagnetic waves of some characteristic wavelength that may appear in or be impressed upon the material, so as to attain quantum mechanical eigenstates.

A use of these materials that can be envisioned, is the optical analog to semiconductor behavior, in which a photonic band gap material, or a plurality of such materials acting in concert, can be made to interact with and control light wave propagation in a manner analogous to the way that semiconductor materials can be made to interact with and control the flow of electrically charged particles, i.e., electricity, in both analog and digital applications.

Photonic crystals have been used to improve the overall performance of many optoelectronic devices. The inventors of the present invention investigated the application of photonic crystals to a multi-channeled, wavelength-division multiplexed (WDM) device. The use of WDM in communication systems allows for better utilization of the spectral bandwidth resources available to the systems. Conventional WDM systems have been proposed using many different technologies, such as planar lightwave circuit (PLC)-based array waveguide gratings (AWGs), and fiber gratings. However, these conventional devices typically have sizes on the order of centimeters or meters, in order to support a large number of sufficiently-spaced wavelength channels. In contrast, photonic crystals enable a much larger number of channels on a much smaller scale. Thus, some conventional WDM devices based on photonic crystals have been proposed. However, these devices are based on the superprism phenomenon, as well as channel drop filters. The superprism phenomenon is the dispersion of light 500 times stronger than the dispersion of light in conventional prisms. A channel drop filter is a device which picks out a small range of frequencies from a waveguide and reroutes it in another direction, leaving the other frequencies unaffected. These conventional WDM devices fail to maximize the density of frequency-selective channels, and thus, fail to maximize usage of the available bandwidth of the photonic crystals.

Thus there is a need in the art to provide a WDM device that maximizes the density of frequency-selective channels, which thereby maximizes usage of the available bandwidth of the photonic crystals.

SUMMARY OF THE INVENTION

The present invention satisfies this need by providing a multi-channel WDM device made from photonic crystals having a bank of high Q-value microcavities tuned to different frequencies.

Additional advantages of the invention will be set forth in part in the description which follows, and in part will be learned from the description, or may be learned by practice of the invention. The advantages of the invention will be realized and attained by means of the elements and combinations particularly pointed out in the appended claims.

In accordance with the purpose of the invention, as embodied and broadly described herein, the invention comprises a multi-channel wavelength division multiplexing (WDM) device, including: a photonic crystal; at least one waveguide created by a line defect formed in said photonic crystal; and a plurality of frequency-selective elements formed in said photonic crystal, wherein each frequency-selective element is capable of selecting a single frequency from a light pulse propagating through said at least one waveguide.

Further in accordance with the purpose, the invention comprises a method of making a multi-channel wavelength division multiplexing (WDM) device, including: providing a photonic crystal; forming at least one waveguide in the photonic crystal by removing at least one row of dielectric rods from the photonic crystal; and forming a plurality of frequency-selective elements in the photonic crystal, wherein each frequency-selective element is capable of selecting a single frequency from a light pulse propagating through the at least one waveguide.

Still further in accordance with the purpose, the invention comprises a method of making a multi-channel wavelength division multiplexing (WDM) device, including: providing a plurality of photonic crystals; forming a waveguide in each of the plurality of photonic crystals by removing at least one row of dielectric rods from each of the plurality of the photonic crystals; forming a plurality of frequency-selective elements in each of the plurality of the photonic crystals, wherein each frequency-selective element is capable of selecting a single frequency from a light pulse propagating through the waveguide; and combining plurality of photonic crystals to form a multi-channel wavelength division multiplexing (WDM) device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION OF THE PREFERRED EMBODIMENT

Figure 1:
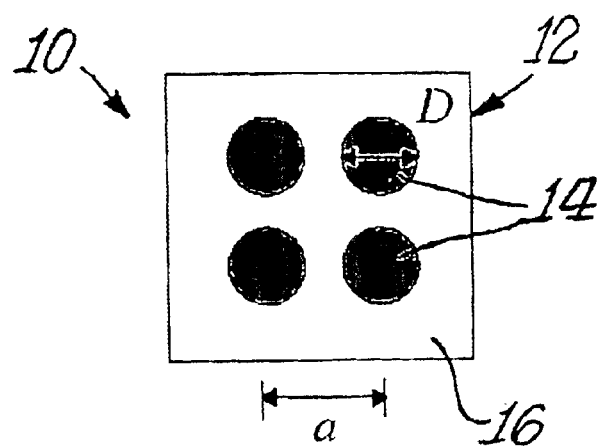
FIG. 1 is a top view of a unit lattice for a two-dimensional photonic crystal in accordance with the preferred embodiment of the present invention, wherein the photonic crystal has a lattice constant $\alpha=350$ nanometers (nm) and a plurality of dielectric rods of diameter D=140 nm and dielectric constant $\in_r=11.6$, on an air background.

Reference will now be made in detail to the present preferred embodiment of the invention, an example of which is illustrated in the accompanying drawings. Wherever possible, the same reference numbers will be used throughout the drawings to refer to the same or like parts.

A. Localization of Light in Photonic Crystals

The physical phenomena that clearly describes the operation of a photonic crystal is the localization of light, which is achieved from the scattering and interference produced by a coherent wave in a periodic structure. In this case a photon located in a lossless dielectric media provides an ideal realization of a single excited state in a static medium at room temperature. To describe this phenomenon, Maxwell's equations are cast into a form similar to Schrodinger's to produce the following Equation (1):

$$\nabla \times (\nabla \times E(r)) = \left(\frac{\omega}{c}\right)^2 \varepsilon(r) E(r), \quad (1)$$

where E(r) is the electric field, ω is the angular frequency, c is the $\in(r)$ is the dielectric function, and r is the position vector. The permittivity can be described as:

$$\in(r) = \in_{av} + \in_{spatial}(r), \quad (2)$$

where $\in_{av}$ is the average value of the dielectric function, and $\in_{spatial}(r)$ is the spatial component of the dielectric function, which is analogous to the potential in Schrodinger's equation. In a photonic crystal there exists a dielectric band and an air band, analogous to the valance band and the conduction band, respectively, in a semiconductor material. Between the dielectric and air bands is the photonic band gap, within which no energy states (or photonic frequencies) exist and, as a result, propagation is prohibited.

Equation (1) defines the main design parameters associated with a photonic crystal, such as the fill factor (defined as the ratio of the area of the unit lattice filled by dielectric to the total area of the entire unit lattice of a photonic crystal), the refractive index contrast between the dielectric material and the host material, the ratio of the lattice constant to the radius of the cylinders (for the case of cylindrical rods), and the wavelength to lattice constant ratio. These parameters define the location and size of the band gap, and whether a band gap may or may not exist for a specific polarization, such as: (1) transverse electric polarization (TE), where the electric field is orthogonal to the plane of incidence; or (2) transverse magnetic polarization (TM), where the magnetic field is orthogonal to the plane of incidence.

The solution to Equation (1) can be represented in the form of a band diagram or a band structure, which defines the areas where band gaps exist. It can be solved using either a frequency-domain method such as the plane-wave expansion method (as disclosed in K. M. Leung and Y. F. Liu, "Photon band structures: The plane-wave method," *Physical Review B*, vol. 41, pp. 10188–1242 (May 1990)), which casts Equation (1) into an eigenvalue problem with E(r) as its eigenfunctions and $(\omega/c)^2$ as its eigenvalues. It can also be solved using a time-domain method such as the Finite-Difference Time-Domain (FDTD) method (as disclosed in A. Taflove, *Advances in Computational Electrodynamics: The Finite-Difference Time-Domain Method*, Artech House (1998), the disclosure of which being incorporated by reference herein in its entirety, except where inconsistent with the present invention).

The present inventors used the FDTD method along with the Perfectly Matched Layer (PML) method (as disclosed in J. P. Berenger, "A perfectly matched layer for the absorption of electromagnetic waves," *J. Comp. Physics*, vol. 114, pp. 185–200 (1994), the disclosure of which being incorporated by reference herein in its entirety, except where inconsistent with the present invention), absorbing boundary conditions to truncate the computational domain. In order to model open region problems, an absorbing boundary condition (ABC) is often used to truncate the computational domain since the tangential components of the electric field along the outer boundary of the computational domain cannot be updated using the basic Yee algorithm. Most of the popular ABC's can be grouped into those that are derived from differential equations or those that employ a material absorber. Differential-based ABC's are generally obtained by factoring the wave equation or those that employ a material absorber. Differential-based ABC's are generally obtained by factoring the wave equation and by allowing a solution, which permits only outgoing waves. Material-based ABC's, on the other hand, are constructed so that fields are dampened as they propagate into an absorbing medium.

For a detailed explanation of the FDTD method, reference should be made to A. Taflove, *Computational Electrodynamics: The Finite-Difference Time-Domain Method*, Artech House (1995), and A. Taflove and S. C. Hagness, *Computational Electrodynamics the Finite-Difference Time-Domain Method*, Artech House (2d ed. 2000).

The spatial localization of light in a photonic crystal is achieved by introducing defects, which can take the form of a line defect or a point defect. In the case of a line defect, the photons that lie within the band gap are not allowed to propagate through the crystal. As a result, they are confined to the defect region, which therefore behaves similar to a waveguide. In the case of a point defect, the photonic crystal creates a localized state, or cavity, that confines a single or a multiple of closely separated modes to the spatial location of the defect. The following section discusses in detail the introduction of point defects into a photonic crystal to create microcavities.

B. Doping of Photonic Crystals

Doping of a semiconductor material may be achieved by either adding a donor or an acceptor atom into the material. Both result in a change in the electrical properties of the semiconductor material to produce either a p-type or an n-type material. In a similar fashion, the optical properties of a photonic crystal can be changed by introducing point defects into the crystal by either adding or removing a certain amount of dielectric material from the crystal. When adding dielectric material to a unit cell of photonic crystal, the dielectric material behaves like a donor atom in a semiconductor, which corresponds to a donor mode and has its origin at the bottom of the band of the photonic crystal. Alternatively, removing dielectric material from a unit cell behaves like an acceptor atom in an atomic crystal, which corresponds to an acceptor mode and has its origins at the top of the band of the photonic crystal. Consequently, acceptor modes are preferable for making single mode laser microcavities, since they allow a single localized mode to oscillate in the cavity. By adding or removing a certain amount of dielectric material to or from the photonic crystal, the symmetry of the photonic lattice is disrupted, which allows for a single state, or multiple closely-separated states, to exist within the band gap. This phenomenon of localizing states by introducing point defects can be useful in designing high Q-value microcavities in photonic crystals.

C. Microcavities in Photonic Crystals

As discussed previously, a microcavity can be made by introducing a point defect into a photonic crystal. As such, the defect can have any shape, size, or dielectric constant. By varying any one of these parameters, the number of modes and the center frequency of the localized mode(s) inside the cavity can be changed. In the case of a square lattice having cylindrical rods, with a difference in dielectric constant between the host material and the lattice material being greater than two, a point defect can be introduced by changing one of the parameters of a given rod within the crystal. For example, a point defect consisting of a rod with a radius smaller than those surrounding it, will guarantee a single mode to be localized at the point defect. Alternatively, if the radius of the defect is increased to be equal to or greater than those surrounding it, a multiple of closely-separated modes are localized within the cavity.

The Quality (Q) factor of the microcavity plays a major role in designing a high-density WDM system. The quality factor depends mainly upon the size of the crystal, as shown by P. R. Villenueve et al., "Microcavities in photonic crystals: Mode symmetry, tuneability, and coupling efficiency," *Physical Review* B. vol. 54, pp. 7837–7842 (September 1996). For high Q-values the size of the crystal surrounding the cavity needs to be large. It has also been shown (by T. Utea et al., "Limits on quality factors of localized defects modes in photonic crystals due to dielectric loss," *J. Applied Physics*, vol. 84, pp. 6299–6304 (December 1998)) that the spectral widths of the defect modes decrease rapidly with an increasing number of lattice layers, which is more favorable in a WDM device since it maximizes the selectivity of the available bandwidth.

Figure 2:
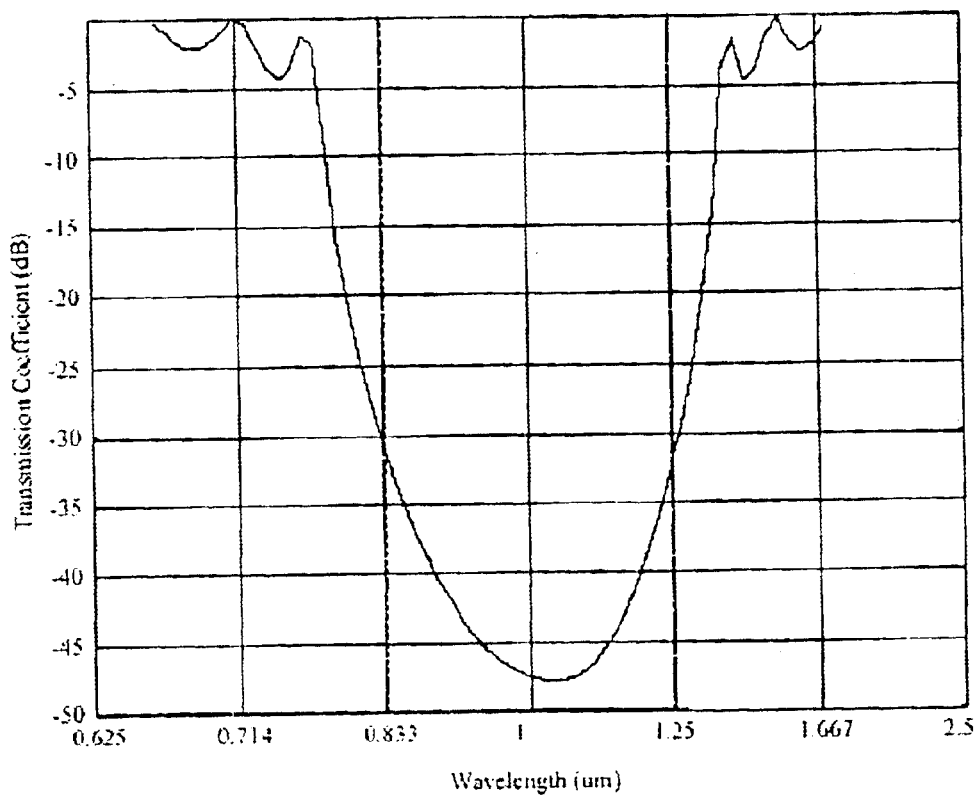
FIG. 2 is a graph showing the transmission spectra of the unit lattice shown in FIG. 1, wherein the band gap of the unit lattice is located between $\lambda=0.833$ μm and 1.25 μm.

The FDTD method may be used to calculate the center frequency of a localized defect mode in a two-dimensional rectangular photonic crystal having circular dielectric rods in an air background, as shown in FIG. 1. In this design, the computational region consisted of a two-dimensional photonic crystal 10 having a square lattice 12 with a lattice constant $\alpha$=350 nm. Lattice 12 includes a plurality of dielectric rods 14 provided on an air background 16, each dielectric rod 14 having a dielectric constant of 11.6 (which corresponds to silicon (Si)) and a diameter D=140 nm. The transmission spectra for crystal 10 may be obtained using either a finite-difference, frequency-domain (FDFD) method or the FDTD method, with periodic boundary conditions. Photonic crystal 10 has a band gap located between wavelengths $\lambda$=0.833 $\mu$m and $\lambda$=1.25$\mu$, as shown in FIG. 2.

In order to provide a single or multiple high Q-value microcavities in a photonic crystal, point defects are introduced into the crystal such that each microcavity has a single localized mode within the band gap of the structure. This enables a wavelength filtering, or de-multiplexing, of a broadband-incident wave, and results in a sequence of narrow band waves that can then be guided through the crystal to any destination using a line defect. To achieve this, each cavity needs to be designed separately, with the resonant mode guided out of the cavity and into a channel. Once complete, the pre-designed single channel cavities can be combined into one system to support multiple channels.

D. Single Channel Cavity

Figure 3:
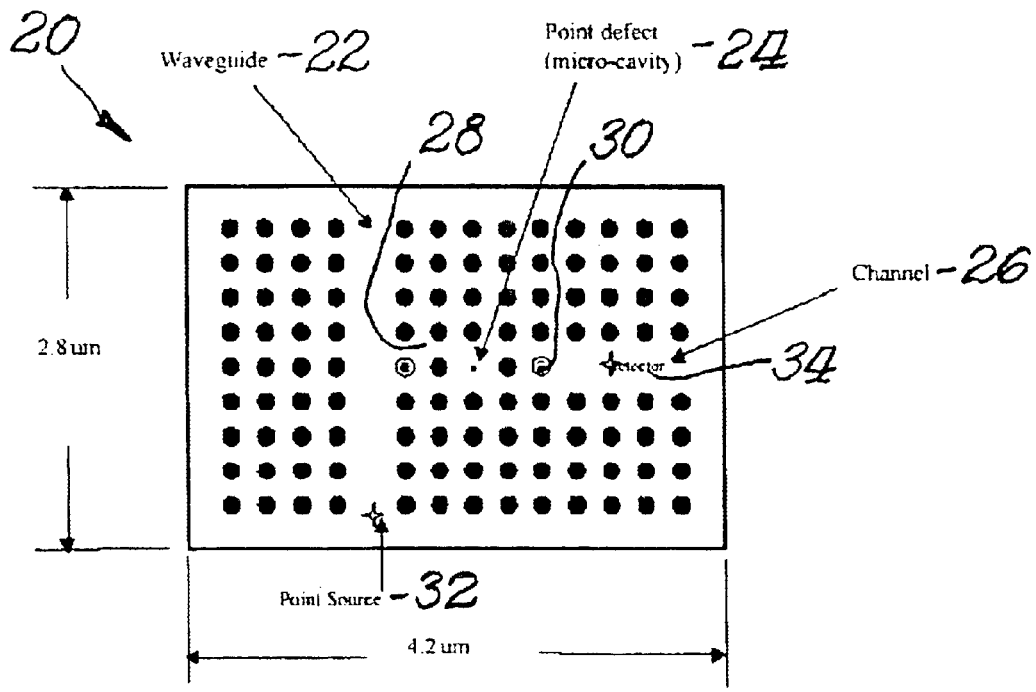
FIG. 3 is a top view of a single channel microcavity in accordance with the preferred embodiment of the present invention, wherein the microcavity has a point defect radius r=52.5 nm and dielectric constant $\in_r=7$, and two rods (shown in light gray) having a dielectric constant $\in_r=8$.

To design a single channel cavity structure 20, in accordance with the preferred embodiment of the present invention and as shown in FIG. 3, a line defect is formed by removing one row of dielectric rods from the photonic crystal. This creates a waveguide 22 within the photonic crystal. A point defect is then formed in structure 20 to create a high Q-value microcavity 24. Microcavity 24 may be used to select a single frequency from a light pulse propagating through main waveguide 22, and re-route it to another waveguide, such as a channel 26. By changing the size, shape, or dielectric constant of microcavity 24, permits either a single (localized) mode or a set of closely-spaced modes that have central frequencies located within the band gap. For example, the diameter and the dielectric constant of the point defect 24 may be changed.

The single channel cavity structure 20 of the present invention is illustrated by the following example, although the present invention is not limited to the dimensions hereinafter described. Structure 20 may be rectangular with a length of 4.2 $\mu$m and a width of 2.8 $\mu$m and have a microcavity 24 with radius r=52.5 nm and a dielectric constant $\in_r$=7. The FDTD method with PML absorbing boundary conditions was used to test structure 20. The computational space had a sampling rate of $\lambda$/40, where $\lambda$ is the wavelength of light in a vacuum. An incident pulse of center wavelength $\lambda_0=1$ µm and a spectral line width of $\Delta\lambda=0.6$ µm was transmitted by a point source 32 through waveguide 22, exciting a single mode of oscillation inside the microcavity 24. The field in microcavity 24 was then coupled to channel 26 through an evanescent field, which was achieved by lowering the dielectric constant to $\in_r=8$ of a rod 28 at the microcavity 24/waveguide 22 interface, and a rod 30 at the microcavity 24/channel 26 interface. A detector 34 was placed inside channel 26 to obtain the wavelength spectrum of the field in channel 26.

In a waveguide, an evanescent field is a time-varying field having an amplitude that decreases monotonically as a function of traverse radial distance from the waveguide, but without an accompanying phase shift. Thus, an evanescent field is a surface wave. An evanescent field is coupled, i.e., bound, to an electromagnetic waveguide or mode propagating inside the waveguide, and may be used to couple to another waveguide or cavity.

Figure 4:
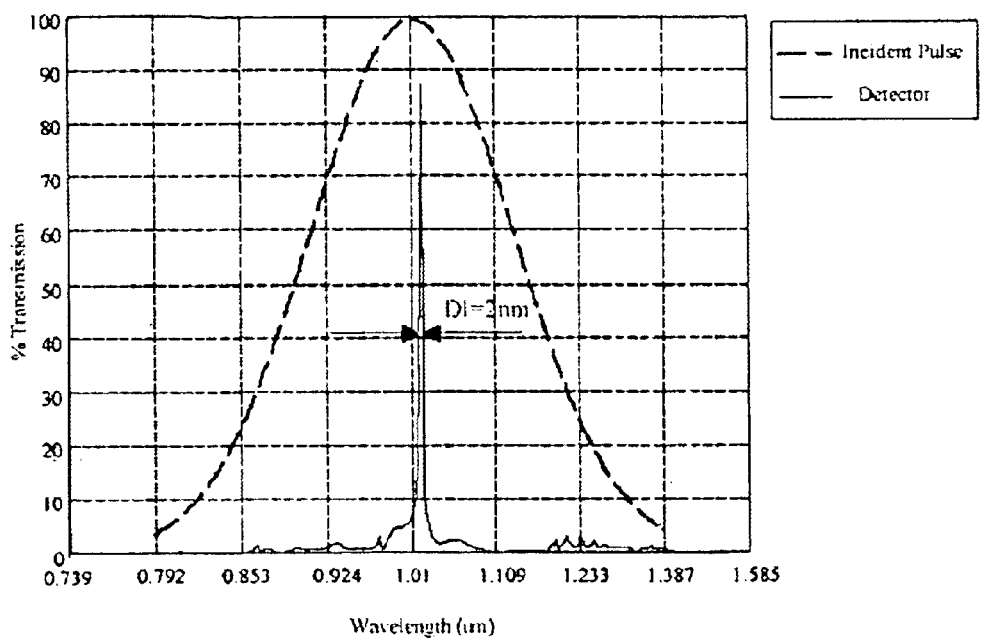
FIG. 4 is a graph showing the wavelength spectrum of the incident pulse and the pulse measured at a detector for the single channel microcavity shown in FIG. 3.

The wavelength spectrum of the channel field is shown in FIG. 4. The spectrum was obtained by taking the Fourier transform of the time-dependent field received by detector 34. As shown in FIG. 4, the quality factor of microcavity 24 was about 2000 and the point defect of r=52.5 nm corresponded to a center wavelength of $\lambda=1.025$ µm and had a spectral line width of $\Delta\lambda=2$ nm. Therefore, for an incident pulse having a spectral line width of $\Delta\lambda=0.6$ µm, nearly 300 ($\Delta\lambda=2$ nm=0.002 µm; 300×0.002 µm=0.6 µm) different channels can be achieved by fine tuning the defect size of the center rod in microcavity 24, while maintaining its dielectric constant at $\in_r=7$.

E. Multi-Channel WDM

Figure 5:
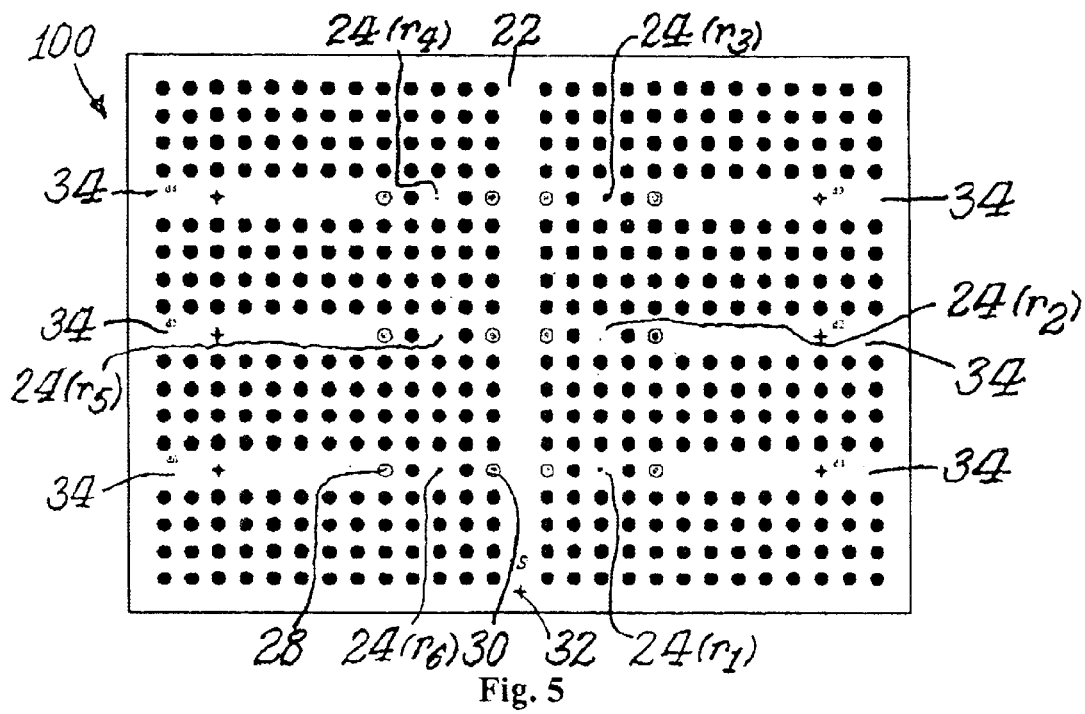
FIG. 5 is a top view of a multi-channel WDM device in accordance with the preferred embodiment of the present invention, wherein the WDM device uses multiple microcavities with different point defect radii $r_1=8.75$ nm, $r_2=17.5$ nm, $r_3=26.25$ nm, $r_4=35$ nm, $r_5=43.75$ nm, and $r_6=52.5$ nm, and each microcavity is connected to a channel within which is placed detectors $d_1$, $d_2$, $d_3$, $d_4$, $d_5$, and $d_6$.

To design a multi-channel cavity WDM structure 100, in accordance with the preferred embodiment of the present invention and as shown in FIG. 5, a plurality of single channel cavity structures 20 shown in FIG. 3, are combined, with each structure 20 having a microcavity 24 of different point defect size, and a corresponding channel 26. As shown in FIG. 5, six single channel structures 20 are combined, although any number of structures 20 can be combined, depending upon the amount channels desired. Each channel 26 branches from a main waveguide 22. Such an arrangement allows for better utilization of the structure 100 by maximizing the density of channels 26 within the computational region.

The multi-channel cavity structure 100 of the present invention is illustrated by the following example, although the present invention is not limited to the dimensions hereinafter described. Structure 100 may be rectangular with a length of 9.1 µm and a width of 6.3 µm, and have a plurality of microcavities 24, each microcavity 24 having a different point defect size as follows: $r_1=52.5$ nm, $r_2=8.75$ nm, $r_3=17.5$ nm, $r_4=26.25$ nm, $r_5=35$ nm, and $r_6=43.75$ nm, wherein the dielectric constants of all microcavities 24 were maintained at $\in_r=7$. A separate analysis was performed for each individual microcavity 24 and resulted in the following center wavelengths: $\lambda_1=1.025$ µm, $\lambda_2=0.875$ µm, $\lambda_3=0.895$ µm, $\lambda_4=0.925$ µm, $\lambda_5=0.94$ nm, and $\lambda_6=0.96$ µm, respectively. Which means that for a point defect radius $r_1=52.5$ nm, the corresponding central wavelength has $\lambda_1=1.025$ µm, for a point defect radius $r_2=8.75$ nm, the corresponding central wavelength has $\lambda_2=0.875$ µm, etc. The FDTD method with PML absorbing boundary conditions was used to test structure 100. A pulse of center wavelength $\lambda_0=1$ µm and spectral line width of $\Delta\lambda=0.6$ µm was transmitted by a point source 32 through waveguide 22, exciting a single mode of oscillation inside each microcavity 24, the fre quency of which was proportional to the size of the defect. A detector 34 was placed inside each channel 26 (the plurality of detectors 34 are shown as $d_1$, $d_2$, $d_3$, $d_4$, $d_5$, and $d_6$ in FIG. 5) to obtain the wavelength spectrum of the field in each channel 26.

Figure 6:
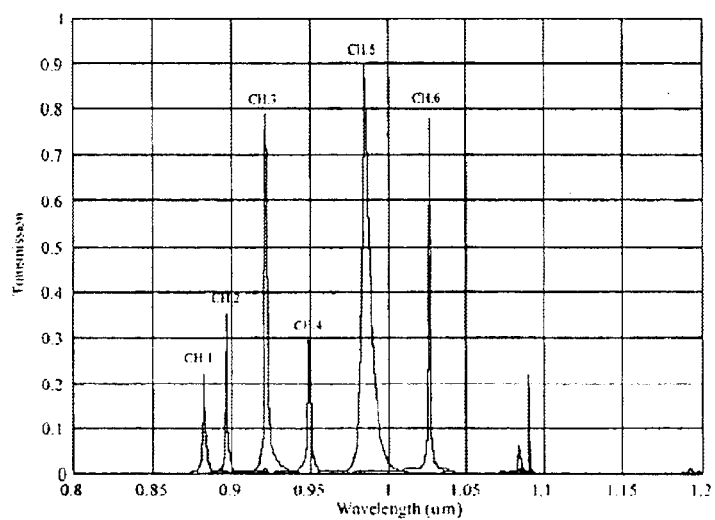
FIG. 6 is a graph showing the normalized wavelength spectrum of the time varying electric field measured at each of the detectors placed inside each of the different channels shown in FIG. 5 as a function of wavelength.

The wavelength spectrum of each channel field is shown in FIG. 6. The spectrum was obtained by taking the Fourier transform of the time dependent field received by each detector 34. As shown in FIG. 6, the channel field wavelength spectrum have Lorentzian line shapes, and the different point defect sizes correspond to different localized modes with different center frequencies. As also shown in FIG. 6, the center wavelength of each channel 26 was found to match the center wavelengths calculated for each individual microcavity 24. FIG. 6 also shows how the center wavelength of each channel 26 is directly proportional to the radius r of each point defect 24. In other words, as the size of the defect 24 is increased, the available bandwidth of the incident pulse is spanned.

It will be apparent to those skilled in the art that various modifications and variations can be made in the multi-channel wavelength division-multiplexing (WDM) device of the present invention and in construction of this device without departing from the scope or spirit of the invention. As an example, dielectric rods may be square, triangular, or rectangular. As well as the case for air holes in a high dielectric background, and/or the case of finite height photonic crystals.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A multi-channel wavelength division multiplexing (WDM) device, comprising:
    a photonic crystal;
    at least one waveguide created by a line defect formed in said photonic crystal; and
    a plurality of frequency-selective elements formed in said photonic crystal, wherein each frequency-selective element is capable of selecting a single frequency from a light pulse propagating through said at least one waveguide, and each frequency-selective element is formed separately with a resonant mode guided out of each frequency-selective element.

2. A multi-channel wavelength division multiplexing (WDM) device as recited in claim 1, wherein each frequency-selective element has a different point defect size than the other frequency-selective elements, and all of said plurality of frequency-selective elements have the same dielectric constant.

3. A multi-channel wavelength division multiplexing (WDM) device as recited in claim 1, wherein said plurality of frequency-selective elements comprises a plurality of high Q-value microcavities.

4. A multi-channel wavelength division multiplexing (WDM) device as recited in claim 1, wherein each frequency-selective element is capable of re-routing its corresponding single frequency from the light pulse propagating through said at least one waveguide to another waveguide.

5. A multi-channel wavelength division multiplexing (WDM) device as recited in claim 2, wherein increasing the point defect size of said plurality of frequency-selective elements, increases the spanning of the available bandwidth of the light pulse.

6. A method of making a multi-channel wavelength division multiplexing (WDM) device, comprising:

providing a photonic crystal;

forming at least one waveguide in the photonic crystal by removing at least one row of dielectric rods from the photonic crystal; and forming a plurality of frequency-selective elements in the photonic crystal, wherein each frequency-selective element is capable of selecting a single frequency from a light pulse propagating through the at least one waveguide, and each frequency-selective element is formed separately with a resonant mode guided out of each frequency-selective element.

7. A method of making a multi-channel wavelength division multiplexing (WDM) device as recited in claim 6, wherein each frequency-selective element has a different point defect size than the other frequency-selective elements, and all of the plurality of frequency-selective elements have the same dielectric constant.

8. A method of making a multi-channel wavelength division multiplexing (WDM) device as recited in claim 6, wherein the plurality of frequency-selective elements comprises a plurality of high Q-value microcavities.

9. A method of making a multi-channel wavelength division multiplexing (WDM) device as recited in claim 6, wherein each frequency-selective element is capable of re-routing its corresponding single frequency from the light pulse propagating through the at least one waveguide to another waveguide.

10. A method of making a multi-channel wavelength division multiplexing (WDM) device as recited in claim 7, wherein increasing the point defect size of the plurality of frequency-selective elements, increases the spanning of the available bandwidth of the light pulse.

11. A method of making a multi-channel wavelength division multiplexing (WDM) device, comprising:

providing a plurality of photonic crystals;

forming a waveguide in each of the plurality of photonic crystals by removing at least one row of dielectric rods from each of the plurality of the photonic crystals;

forming a plurality of frequency-selective elements in each of the plurality of the photonic crystals, wherein each frequency-selective element is capable of selecting a single frequency from a light pulse propagating through the waveguide, and each frequency-selective element is formed separately with a resonant mode guided out of each frequency-selective element; and combining the plurality of photonic crystals to form a multi-channel wavelength division multiplexing (WDM) device.

* * * * *